US005600941A

United States Patent [19]
Strosser

[11] Patent Number: 5,600,941
[45] Date of Patent: Feb. 11, 1997

[54] COMPENSATION FOR START-UP TRANSIENTS

[75] Inventor: Richard P. Strosser, Akron, Pa.

[73] Assignee: New Holland North America, Inc., New Holland, Pa.

[21] Appl. No.: 414,328

[22] Filed: Mar. 31, 1995

[51] Int. Cl.⁶ .................................................. A01D 75/18
[52] U.S. Cl. .................. 56/10.2 J; 56/10.3; 56/DIG. 15; 340/684
[58] Field of Search ........................... 56/10.2 J, 10.2 R, 56/10.3, DIG. 15; 460/2, 3; 340/679, 684

[56] References Cited

U.S. PATENT DOCUMENTS

| | | | |
|---|---|---|---|
| 3,757,501 | 9/1973 | Bennett, Jr. et al. | 56/10.2 J |
| 3,889,249 | 6/1975 | Bennett, Jr. et al. | 340/684 |
| 3,972,156 | 8/1976 | Bennett, Jr. et al. | 56/10.2 J |
| 4,531,118 | 7/1985 | Beams | 340/684 |
| 4,837,511 | 6/1989 | Whittington et al. | 324/236 |
| 4,854,113 | 8/1989 | Strosser et al. | 56/10.2 J |
| 5,070,682 | 12/1991 | Bohman | 56/10.2 J |

Primary Examiner—Terry Lee Melius
Assistant Examiner—Heather Shackelford
Attorney, Agent, or Firm—Griffin, Butler, Whisenhunt & Kurtossy

[57] ABSTRACT

In a two-channel magnetic metal detector for a forage harvester, positive and negative adaptive detection thresholds are varied according to long term changes in the noise component induced in detection coils by moving ferrous parts of the crop feed mechanism. The adaptive detection thresholds are set at levels determined by the positive and negative peak averages of the noise components in the channels while the crop feed mechanism is running at normal speed. Start-up transient noise induced in the detection coil as the crop feed mechanism accelerates may exceed the adaptive thresholds as thus set, thereby triggering false indications that a tramp metal object has been detected in the crop feed path. At start-up of the crop feed mechanism, the detection thresholds are raised to prevent false indications. An increase in a channel noise signal is taken as an indication that the crop feed mechanism is accelerating. The detection thresholds are then raised to a level above any transient noise level expected during acceleration of the crop feed mechanism. After a predetermined time sufficient for the feed mechanism to reach normal operating speed, the detection thresholds are set at their adaptive detection levels.

11 Claims, 4 Drawing Sheets

{{5,600,941}}

COMPENSATION FOR START-UP TRANSIENTS

RELATED APPLICATION

This application incorporates by reference the disclosure of my concurrently filed application Ser. No. 08/414,329 entitled Adaptive Thresholding For Metal Detection and assigned to the same assignee as this application.

BACKGROUND OF THE INVENTION

It is conventional to provide harvesting machines such as forage harvesters with a metal detector for detecting tramp metal picked up from a field with crop material. A typical metal detector comprises means for generating a magnetic detection field through which the corp feed path extends, first and second detection coils disposed in the detection field, and first and second channels or detection circuits connected to the first and second detection coils, respectively. Tramp metal objects passing through the magnetic detection field disturb the detection field thus inducing an emf (electromotive force) across each detection coil. The emf induced across each coil is amplified and filtered by one of the detection circuits so as to produce two channel output signals which are each compared with a positive and a negative detection threshold value. If the magnitude of a channel output signal exceeds a threshold value, it is taken as an indication that tramp metal has been detected. The crop feed mechanism of the harvester is stopped so that the tramp metal is not transported into the cutter mechanism which chops the crop material.

The detection field, of necessity, is established in a region of the harvester having moving ferrous metal parts. Movement of the harvester parts in the detection field results in a noise component in the emf induced across the detection coils. Filters may be provided in the detection circuits to eliminate some, but not all, of the noise component. Therefore, it is conventional to set the detection thresholds at twice the average value of the noise component of each channel output signal so that the noise will not trigger a false indication that tramp metal has been detected in the crop feed path.

The noise generated by moving parts of the harvester varies. It is greatest at the time the crop feed mechanism is engaged and accelerating and drops to a lower value as the crop feed mechanism reaches its normal speed. The detection thresholds are therefore set at levels such as twice the start-up noise level to allow a safety factor. However, the sensitivity of the metal detector, that is, its ability to detect tramp metal objects of smaller size, decreases as the detection thresholds are increased. If it were not for the start-up noise the detection thresholds could be set at lower levels, that is, at twice the noise level at the normal operating speed of the crop feed, thus increasing the sensitivity of the detector without increasing the chances of triggering a false indication that tramp metal has been detected.

In my above-mentioned application I disclose a metal detector system wherein the positive and negative peaks of the noise component of a channel output signal are filtered to provide average positive peak and average negative peak values of the noise component. The adaptive detection thresholds are then set and varied according to the average peak noise values. The average noise values are stored and updated in a flash ROM ($E^2$PROM) so that they are available at system wake-up. This permits the setting of the adaptive detection thresholds and the filters at the levels existing at the time of system shut-down. Therefore, it is not necessary to wait for the filters to long-term (8 min) average the peak noise signals before the adaptive thresholds are set. This creates a problem in that the adaptive detection thresholds are set for the noise components existing under running conditions and do not take into account the larger noise components which exist at the time the crop feed mechanism is started.

SUMMARY OF THE INVENTION

An object of the invention is to provide a novel method and apparatus for improving the sensitivity of a metal detector in a harvester without increasing the likelihood of producing false detection signals due to noise.

Another object of the invention is to provide a metal detector wherein the probability of producing a false object detection signal at start-up is reduced.

A further object of the invention is to provide a method and apparatus for improving the sensitivity of a metal detector by setting the channel detection thresholds at a first level during the time the crop feed mechanism is accelerating and setting the detection thresholds at a second level, lower than said first level, when the crop feed mechanism reaches a normal operating speed. In a preferred embodiment, the second detection thresholds are determined by the average noise component in the channel output signal at the time the crop feed was stopped and acceleration of the crop feed mechanism is detected by sensing a change in the magnitude of a channel output signal.

Other objects and advantages of the invention and the manner of making and using it will become obvious from the following description and the accompanying drawings.

BRIEF DESCRIPTION OF DRAWINGS

FIG. 1 illustrates a forage harvesting machine of the kind in which the present invention may be employed. It will be apparent that the invention may also be employed with benefit for the protection of other types of farm machinery, and that it has other monitoring and alarm actuating applications aside from protecting farm machinery from damage caused by the ingestion of metal objects. The forage harvester, generally designated by reference numeral 10, comprises a base unit 11 and an attachment 12 for gathering crop material and feeding it to the base unit for processing. Attachment 12 directly cuts crop material in the field and feeds it to base unit 11 where it is chopped and eventually conveyed to a trailing forage wagon (not shown). The attachment 12 includes a reel 13, depicted in phantom, which operates in a conventional manner to guide material over a cutter bar 14 and up an inclined floor 15 to a consolidating auger 16, also depicted in phantom outline. Attachment 12 is pivotally mounted to base unit 11 at 17 and is adapted to feed crop material to the space between upper and lower front reed rolls 18, 20 and then on to upper and lower rear feed rolls 21, 22 which in turn feed material to a cutterhead 23 (shown in phantom) which chops the crop material and guides it rearwardly to conveyor means 24 in a well known manner. The conveyor 24 commonly comprises an auger mounted traversely for feeding the chopped crop material to a blower unit which conveys it upwardly via a vertical spout 25 (partially shown) and then rearwardly to a trailing forage wagon.

Figure 1:
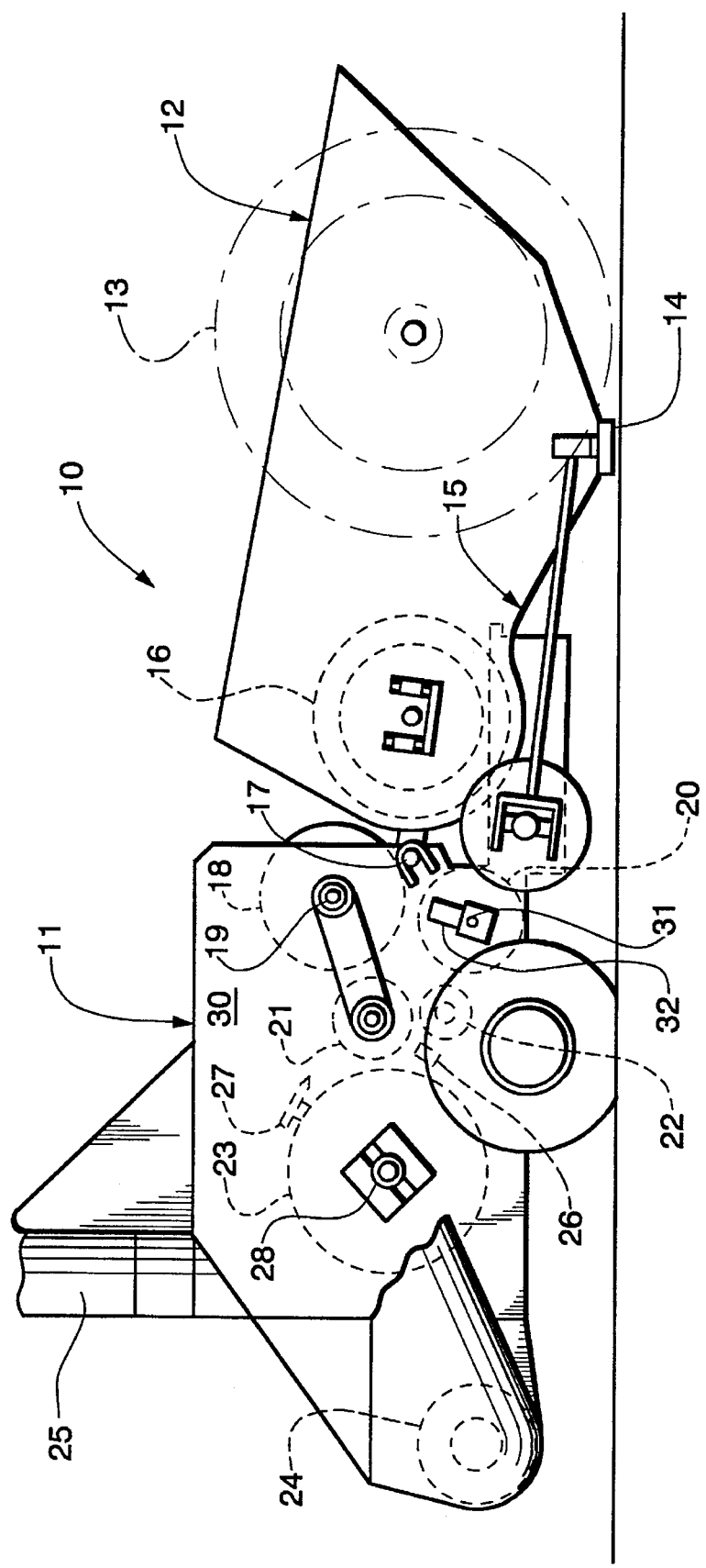
FIG. 1 shows a forage harvester having a metal detector disposed in a crop feed roll adjacent the crop feed path.

The front and rear pairs of upper and lower feed rolls compress into a mat-like configuration the crop material which has been gathered by the attachment and consolidated by auger 16. The mat of material is fed rearwardly across the top surface of a shearbar 26 which is operatively associated with a series of cutting elements 27 (one of which is shown in phantom) on rotating cutterhead 23 journaled for rotation by mounting assembly 28 in sidewall 30 of base unit 11.

Figure 2:
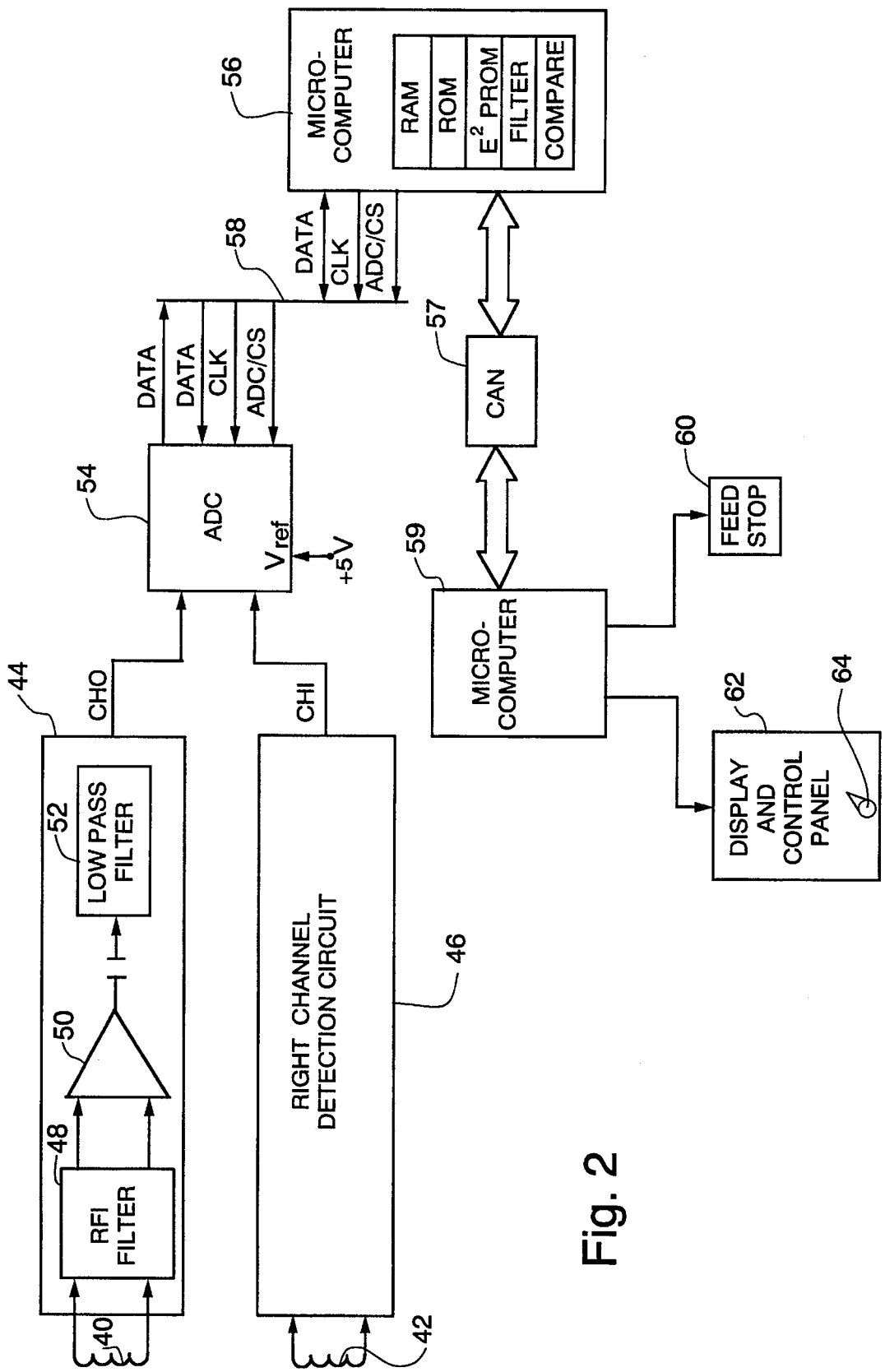
FIG. 2 is a schematic circuit diagram for a two-channel metal detector.

A magnetic metal detector system, indicated by numeral 32, is supported on a stationary shaft 31 within the lower front feed roll 20. In a preferred embodiment, the metal detector system comprises a two-channel detector having first and second detection coils 40, 42 (FIG. 2) disposed within a static magnetic detection field generated by suitable means such as permanent or electromagnets (not shown), the detection coils 40, 42 being connected to first and second channels or detection circuits 44, 46, respectively. The arrangement of the detection coils, detection circuits and the magnetic detection field may be as shown in U.S. Pat. No. 4,433,528. The crop feed path extends through the magnetic detection field so that any ferrous metal object passing through the crop feed path disturb the lines of flux in the detection field. The resulting flux change induces an emf in the detection coils 40, 42. The moving metal parts of the harvester also disturb the flux in the detection field and thus introduce a noise component into the output signals from channels 44, 46.

Detection circuit 44 comprises an RFI filter 48, a differential amplifier 50 and a low pass filter 52. It will be understood that detection circuit 46 includes components like those provided in detection circuit 44 hence only detection circuit 44 will be explained.

The first detection coil 40 is connected to RFI filter 48. The purpose of this filter is to filter out any RF interference induced in detection coil 40. The output of filter 48 is connected to the differential amplifier 50 which amplifies the emf induced in detection coil 40. The output signal from amplifier 50 is applied to the low pass filter 52. The purpose of this filter is to filter out the higher frequency noise component induced in coil 40 by moving ferrous parts of the harvester while passing lower frequency components such as are induced in coil 40 by passage of a metal object through the detection field. The filter 52 cannot filter out all of the noise component from the channel detection signal hence the output signal from detection circuit 44 (or 46) may have a wave form similar to that shown in FIG. 3 wherein the variations of low amplitude shown in solid line represent unfiltered noise and the larger positive and negative swings shown in phantom represent the sum of unfiltered noise and the signal induced a detection coil by passage of a metal object through the detection field.

The output signal of filter 52 is the first or left channel output signal CH0 and it is applied to one input of a multi-channel analog to digital converter (ADC) 54. The right channel output signal CH1 is applied to a second input of the ADC.

ADC 54 is controlled by a conventional microcomputer 56 having RAM, ROM and flash ROM ($E^2$PROM) memories and a program controlled microprocessor. The microcomputer is connected to ADC 54 via a conventional serial data link or bus 58. The microcomputer 56 is connected through a serial data link to a further microcomputer 59. Microcomputer 59 in turn is connected to a conventional stop means 60 for stopping the crop feed mechanism of the harvester when a tramp metal object is detected in the crop feed path, and to an operator's control panel 62 having manual input switches 64 and an alpha numeric display.

During normal operation, that is, when the metal detector is being operated to sense the passage of tramp metal through the crop feed path, the microcomputer 56 controls ADC 54 to sample the detector channel output signals CH0 and CH1 every 2.5 ms and produce digitized channel output signals which are transferred to the microcomputer. The ADC has a resolution of 256 steps (0–255) and is biased at 128. That is, when a detector channel output signal CH0 or CH1 is sampled by the ADC and has a 0 value, the ADC produces the digital value 128.

The detector channel output signals are bipolar. A metal object, either a machine part or tramp metal, entering the magnetic detection field disturbs the flux of the field so that an emf is induced across detection coils 40 and 42 thereby inducing current flows in first directions through the coils, and as the metal object exits from the detection field and the flux returns toward its original state an emf of opposite polarity is induced in each coil causing current flows in second directions through the coils. This causes differential amplifiers 50 in the channel detection circuits 44, 46 to produce output signals exhibiting positive and negative excursions. Thus, the magnitudes of the positive and negative excursions of the output signal from each channel must be tested in order to determine if a tramp metal object is passing through the detection field.

Each time a digitized sample of the magnitude of the left channel output signal CH0 is transferred to the microcomputer 56 it is compared with first and second adaptive threshold values. These threshold values represent the minimum positive peak amplitude and minimum negative peak amplitude, respectively that the signal CH0 must have for the system to produce a signal indicating detection of a tramp metal object. That is, if the signal CH0 has a positive peak value greater than the first threshold value or a negative peak value greater (more negative) than the second threshold value it is assumed that a tramp metal object has been detected. The microcomputer 56 sends a control signal via serial link 57 and microcomputer 59 to stop means 60 to stop the crop feed.

In like manner the digitized samples of the right channel output signal CH1 are transferred to microcomputer 56 and compared with third and fourth adaptive threshold values ADAPT.RPOSTH and ADAPT.RNEGTH.

As explained in my above-referenced copending application, the microcomputer 56 is programmed to repetitively perform the following sequence of operations for both the right and left channel output signals. First, about 2500 samples of the channel output signal are taken over about a 6.25 sec interval. From these samples certain ones are disregarded either because their magnitude is so high they represent detection of tramp metal, or so low they indicate that the crop feed mechanism is not running.

Figure 3:
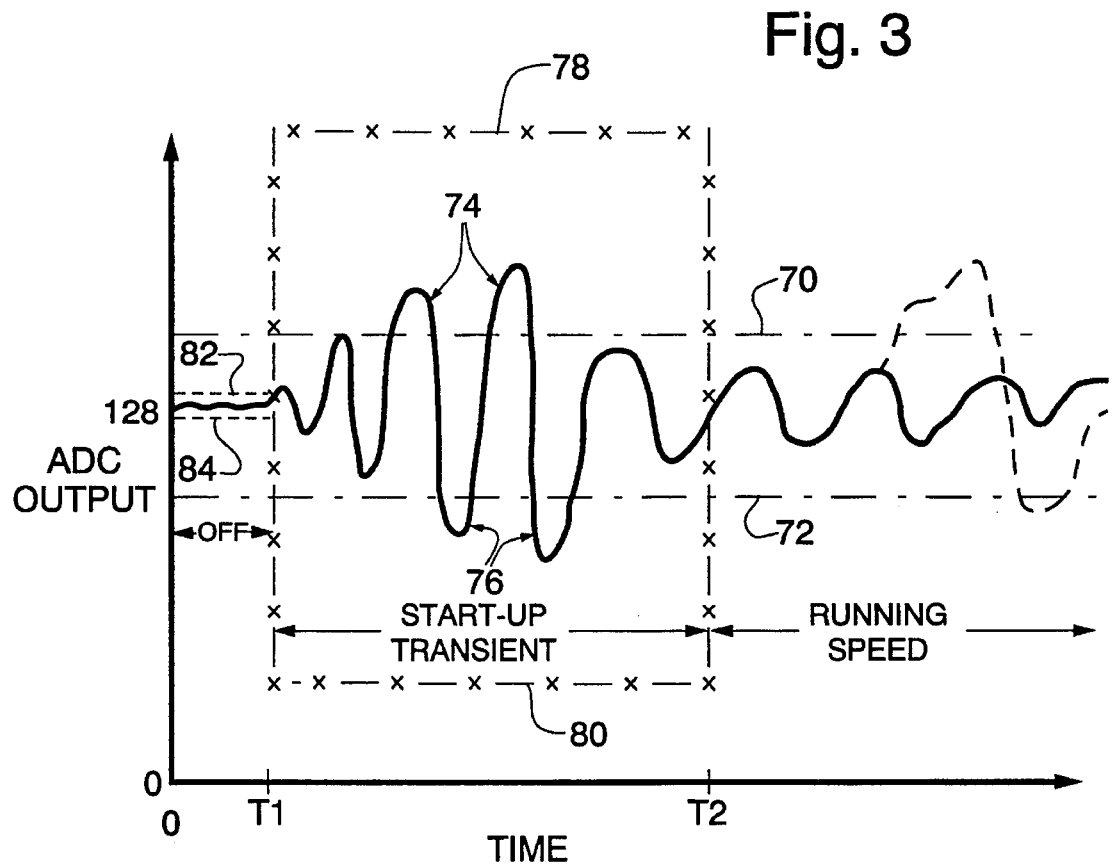
FIG. 3 illustrates the waveform of a typical channel output signal before, during and immediately after the crop feed mechanism is started; and, FIG. 4 is a flow chart illustrating operations performed by the microcomputer of FIG. 2 to set the channel detection thresholds.

The positive peak value and the negative peak value of the remaining samples is then fed to two long term filters (8 min) which produce an average positive peak and an average negative peak value. These two values represent the average peak positive value and the average peak negative value of the noise component of the channel output signal when the crop feed is running. Two storage locations in the E²PROM are updated as these values change. Furthermore, as the average peak positive value or the average peak negative value changes, the positive or negative adaptive detection threshold is changed. The adaptive detection thresholds are set, for example, at about twice the average peak value of the noise component. This is illustrated in FIG. 3 where the positive adaptive detection threshold 70 and the negative adaptive detection threshold 72 are set at about twice the average peak positive value and average peak negative value of the noise component when the crop feed is at normal running speed.

When the system is shut down, the most recent average positive peak and average negative peak values are present in the E²PROM so that the filters and adaptive detection thresholds may be reset at power-up to the values they had at system shut-down.

Normally, the microcomputers 56 and 59 wake up when an ignition key on the harvester is turned on. The engine is started before the clutch for the crop feed mechanism is engaged. However, even though the crop feed mechanism is not engaged there is a very small noise component present in the channel output signal. This small noise signal is shown in FIG. 3 in the interval T0 to T1.

When the crop feed mechanism is engaged at time T1, the noise component introduced into the channel output signals by the feed mechanisms rises rapidly as the feed mechanism accelerates, and when the feed mechanism reaches its normal running speed (T2) the noise component drops but remains substantially greater than the noise during the interval T0–T1.

During the time the crop feed mechanism is accelerating, the positive and/or negative peaks of the noise component may exceed the positive and/or negative adaptive detection thresholds 70, 72 which have been established at twice the average peak noise during normal speed of the crop feed mechanism. In FIG. 3, the positive transient peaks 74 and negative transient peaks 76 exceed their corresponding threshold and any one of these peaks would trigger a false indication that a metal object has been detected.

In accordance with the present invention, the detection thresholds 70 and 72 are increased to higher start-up levels 78, 80, respectively, during the interval that the crop feed mechanism is accelerating. The levels 78, 80 may be predetermined values stored in ROM at the factory, the values being determined by testing the actual magnitudes of the noise components at start-up and adding a safety factor to the values obtained from the test.

Alternatively, and preferably, the start-up thresholds 78, 80 for each channel are adaptively set and varies in a manner similar to the way the adaptive detection thresholds 70 and 72 are set and varied. That is, during each start-up interval T1–T2, samples are taken of the channel output signals and positive and negative average start-up peak values of the noise component in each channel are determined and stored in the E²PROM. On a given start-up of the crop feed mechanism, the stored values of the filtered start-up noise averages are retrieved from the E²PROM to restore the filters, and the new peaks are averaged in. This has the advantage that the transient thresholds are automatically increased as aging parts of the crop feed mechanism induce an increasingly large noise component into the channel output signals.

Figure 4:
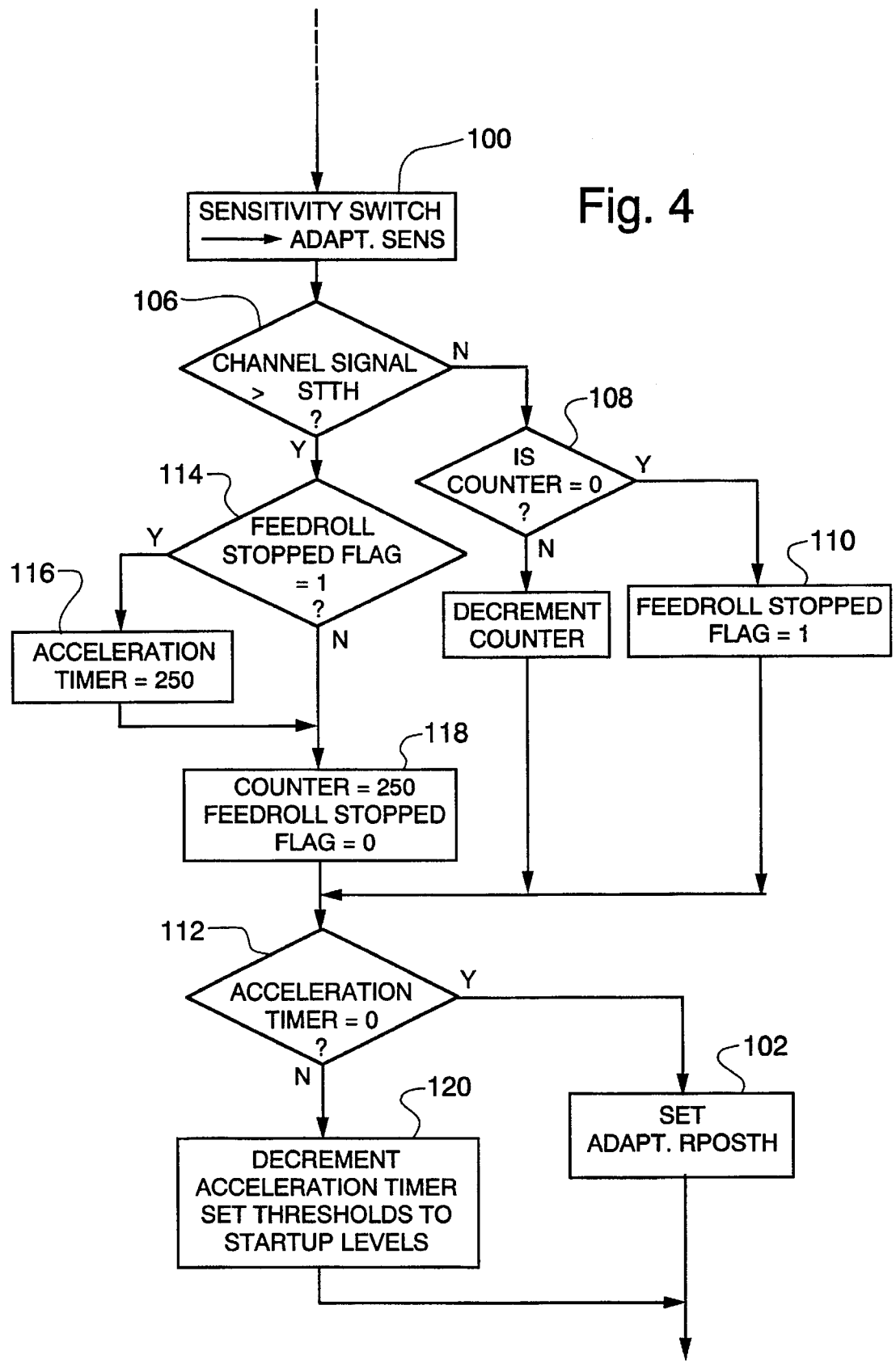

FIG. 4 illustrates the steps performed by microcomputer 56 in setting the thresholds to take into account the large start-up transients. The steps shown in FIG. 4 may be integrated into the ADAPT_MAIN1 routine described in my aforementioned application. Steps 100 and 102 correspond to the same numbered steps of the referenced application.

At step 106 of FIG. 4, the microcomputer compares the channel output signals with start thresholds STTH stored in ROM and chosen to be slightly above the noise levels which might be expected in the interval T0–T1 in FIG. 3. In a typical embodiment these thresholds may be set at the bias level ±12. If a output signal exceeds either of the thresholds STTH (either 82 or 84 in FIG. 3) then at step 108 a counter is tested for a zero value. This counter set to 250 at step 118 as subsequently described. The counter is reset during initialization and will be zero the first time step 108 is executed so at step 110 a Feedroll Stopped flag is set and the routine advances to step 112 where an Acceleration Timer is tested for a zero value.

The Acceleration Timer is reset to zero during initialization and is set to 250 at step 116 as subsequently described. Since the Acceleration Timer contents are assumed to be zero, a branch is made to step 102 where the adaptive thresholds are set in the manner described in my above referenced application. To make the present application consistent with the referenced application step 102 indicates the setting of only the positive adaptive threshold for the right channel. It will be understood that the other thresholds are similarly set.

The routine of FIG. 4 is executed about every 5 ms on a non-interrupt basis. As long as the channel signal does not exceed either threshold, steps 104, 106, 108, 110, 112 and 102 are executed. These conditions correspond to the interval T0–T1 in FIG. 3.

When a channel output signal exceeds one of the thresholds STTH, as occurs at T1 in FIG. 3, the test at step 106 proves true. The Feedroll Stopped flag is tested (step 114) and since it is now set the Acceleration Timer is set to the value 250 at step 116. The counter is also set to 250 (step 118).

Next, the Acceleration Timer is tested at step 112 and since it now contains a non-zero value the routine advances to step 120 where the Acceleration timer is decremented and the detection thresholds are set to the start-up levels indicated at 78 and 80 in FIG. 3, taking into account any sensitivity value in ADAPT.SENS.

From FIG. 3 it is obvious that once acceleration has begun the noise component of a channel only intermittently exceeds the thresholds during its oscillations about the bias value. The purpose of the counter tested at step 108 is to prevent the Feed Stopped flag from being set as the transient noise signal approaches and crosses the bias level.

Thus, during the acceleration interval the test at step 106 may or may not prove true. If it does not prove true, the counter is tested at step 108 and since it is not equal to zero it is decremented at step 122. The Acceleration Timer is tested at step 112 and since it contains a non-zero count it is decremented at step 120 and the detection thresholds are again set at the transient threshold levels 78 and 80.

If the test at step 106 does prove true then the Feedroll Stopped flag is tested (step 114) and since it has been reset step 118 is executed to again set the counter to 250 and reset the Feedroll Stopped Flag (already reset). The Acceleration Timer is tested at step 112 and if it has not been decremented to zero it is decremented at step 120 and the detection thresholds are again set at the transient threshold levels.

It is the Acceleration Timer which times the interval of acceleration T1–T2 in FIG. 3. It will be noted in FIG. 4 that once the Acceleration Timer is set, it is decremented at step 120 regardless of whether the channel signal exceeds either of the threshold levels STTH. The counter prevents the Feedroll Stopped flag from being set once it has been set. After being set, and subsequently reset, the Feedroll Stopped flag, tested at step 114 prevents the Acceleration Timer from being reloaded. Therefore, after about 1.25 ms an execution of step 120 will reduce the count in Acceleration Timer to zero. On the next and subsequent executions of the routine the test of the Acceleration Timer at step 112 will prove true and the detection thresholds will be set (step 102) to the adaptive threshold levels 70, 72.

Although a specific preferred embodiment of the invention has been described in detail by way of illustration, various modifications and substitutions may be made in the described embodiment without departing from the spirit and scope of the invention as defined by the appended claims. For example, the start of acceleration may be determined by other means such as, for example by sensing movement of a part of the crop feed mechanism. It is also possible to sense the noise component in one channel during the interval T0–T3 to determine the start of acceleration, or even sense only the positive or negative peak of the noise signal during this interval. Other modifications falling within the scope of the invention as defined by the appended claims will be obvious to those skilled in the art.

I claim:

1. A method of operating a magnetic metal detector in a forage harvester having moving parts, including a crop feed mechanism, which induce a noise component in the detector output signal, said detector output signal including a detection component when passage of tramp metal through the crop feed mechanism is detected, said method comprising:

sensing the start of acceleration when said crop feed mechanism is started;

when the start of acceleration is sensed, establishing positive and negative thresholds at levels such that the noise component alone of the detector output signal will not exceed either threshold level while said crop feed mechanism is accelerating but said detector output signal may exceed either threshold level; and, after the crop feed mechanism has reached a normal running speed, adjusting the positive and negative thresholds to levels whereby the detector output signal will exceed at least one of the positive and negative thresholds when a metal object is detected.

2. A method as claimed in claim 1 wherein sensing of the start of acceleration comprises determining if the magnitude of the noise component of the detector output signal exceeds a predetermined level.

3. A method as claimed in claim 1 wherein the levels at which said positive and negative thresholds are established when the start of acceleration is sensed is dependent on the average positive peaks and average negative peaks of the noise component during prior intervals of acceleration following prior starts of said crop feed mechanism.

4. A metal detector system for a harvesting machine having moving parts including a crop feed mechanism for feeding crop material along a crop feed path, said metal detector system comprising:

at least one channel and a detection coil connected to said channel and disposed in a magnetic detection field for detecting the presence of metal objects passing along said crop feed path, said channel producing a channel output signal including a noise component induced by moving parts of the harvesting machine;

means for comparing said output signal with positive and negative threshold values when said crop feed mechanism is running at a normal operating speed;

sensing means for sensing when said crop feed mechanism is started; and, means responsive to said sensing means for increasing the positive and negative thresholds during an interval that the crop feed mechanism is accelerating from the start up to the normal operating speed.

5. A method as claimed in claim 1 wherein the step of establishing positive and negative thresholds when the start of acceleration is sensed comprises:

when a start of a first acceleration is sensed,
taking samples of the detector output signal during said first acceleration,
determining the positive and negative average start-up values of the noise component of the detector output signal during said first acceleration,
storing said positive and negative average start-up values determined during said first acceleration, and,
using said values to establish the positive and negative thresholds when a start of a second acceleration is sensed.

6. A method as claimed in claim 1 wherein said positive and negative thresholds are established by storing values representing the thresholds to be established in a memory, and accessing said memory to obtain said values and establish said positive and negative thresholds when the start of acceleration is sensed.

7. A method as claimed in claim 1 and further comprising the step of stopping said crop feed mechanism when said detector output signal exceeds one of the established positive and negative thresholds or one of the adjusted positive and negative thresholds.

8. A metal detector system as claimed in claim 4 and further comprising means responsive to said channel output signal for stopping said crop feed mechanism when the presence of a metal object is detected and said crop feed mechanism is accelerating or is running at a normal operating speed.

9. A method of operating a magnetic metal detector system in a harvester having moving parts, including a crop feed mechanism, which induce a noise component in the detector output signal, said detector output signal including a detection component when said detector detects a piece of tramp metal moving through said crop feed mechanism, said method comprising:

sensing the start of acceleration when said crop feed mechanism is started;

when the start of acceleration is sensed, establishing a first positive and a first negative threshold against which said detector output signal is compared during acceleration of said crop feed mechanism, said first positive and first negative threshold being established at respective first levels such that the noise component of said detector output signal will not exceed said first levels but the sum of said noise component and said detection component may exceed said first levels;

after the crop feed mechanism has reached a normal running speed, establishing a second positive and a second negative threshold against which said detector output signal is compared, said second positive and second negative threshold being established at respective second levels such that the detector output signal will exceed at least one of said second positive and second negative thresholds when tramp metal is detected; and, stopping said crop feed when said detector output signal exceeds one of said first levels during acceleration of said crop feed mechanism or one of said second levels after said crop feed mechanism has reached said normal running speed.

10. A method as claimed in claim 9 wherein said respective first levels have different magnitudes.

11. A method as claimed in claim 9 wherein said first positive and first negative thresholds are greater than said second positive and second negative thresholds, respectively.

\* \* \* \* \*